United States Patent [19]

Gehring et al.

[11] 4,304,503

[45] Dec. 8, 1981

[54] OPPOSITE THREADED STUD

[75] Inventors: James H. Gehring, Fairview Park; James H. Gehring, Jr., Bay Village, both of Ohio

[73] Assignee: Semblex Corporation, Elmhurst, Ill.

[21] Appl. No.: 135,310

[22] Filed: Mar. 31, 1980

Related U.S. Application Data

[63] Continuation of Ser. No. 831,118, Sep. 7, 1977, abandoned.

[51] Int. Cl.³ .............................................. F16B 35/00
[52] U.S. Cl. ................................. 403/407; 29/526 R; 411/389
[58] Field of Search ................. 85/42; 151/37, 41, 73, 151/16; 248/25; 29/526 R; 403/296, 343, 43, 406–408

[56] References Cited

U.S. PATENT DOCUMENTS

| | | | |
|---|---|---|---|
| 1,895,845 | 1/1933 | D'Halloy | 85/42 UX |
| 2,544,522 | 3/1951 | Bertelsen | 29/526 X |
| 2,653,835 | 9/1953 | Nelson | 85/1 R |
| 2,833,326 | 5/1958 | Knohl | 151/37 |
| 3,245,449 | 4/1966 | Mitchell | 151/37 |
| 3,455,198 | 7/1969 | Barrett | 85/1 R |
| 3,841,768 | 10/1974 | Adams | 403/118 X |
| 3,897,713 | 8/1975 | Gugle | 85/42 |
| 3,943,818 | 3/1976 | Pryor et al. | 85/42 |
| 4,015,504 | 4/1977 | Rosan, Sr. et al. | 85/42 |

FOREIGN PATENT DOCUMENTS 821883 11/1951 Fed. Rep. of Germany .......... 85/42

*Primary Examiner*—William E. Lyddane
*Attorney, Agent, or Firm*—Gipple and Hale

[57] ABSTRACT

A double ended stud fastening assembly with coaxially disposed stud shanks separated by an outwardly projecting rigid flange. The first shank includes a helical thread formed thereon in one direction and the second stud shank includes a helical thread formed thereon in a direction opposite the direction of the thread on the first shank. The surfaces of the rigid flange adjacent the first and second shank are substantially planar with the flange body extending perpendicular to the axis of the shanks so that when the second stud shank is mounted in a workpiece a subsequent attachment member placed over the first stud shank will be held in place by a nut.

17 Claims, 6 Drawing Figures

OPPOSITE THREADED STUD

This is a continuation application of Ser. No. 831,118, filed Sept. 7, 1977, now abandoned.

DESCRIPTION OF THE PRIOR ART

Studs of the double-ended variety have been previously utilized which incorporate coaxially arranged threaded shanks. The shanks are threaded so that one of the shanks may be inserted in a work aperture and screwed into the workpiece while the other shank extends away from the workpiece for subsequent attachment of an associated threaded member such as a nut. A common problem with such prior art fasteners is the tendency of the shank inserted in the workpiece aperture to back out during subsequent disengagement of an associated threaded member with the upstanding threaded shank.

Another problem occurs after a nut has been placed on the upstanding threaded shank of the stud and the fastener is painted over or corrosion forms on the threads of the shank fastening the nut to the threads. When the nut is removed from the upstanding threaded shank of the stud the bottom shank of the stud often loosens or backs out from the material of the workpiece since the nut requires a high loosening torque. This problem is particularly acute in the automotive industry where grills and other supported structures on the workpiece sometimes requires the supported structure to be removed from the workpiece and later refastened to the workpiece. Previous fastener assemblies have caused destruction of a considerable percentage of workpieces and supported structures resulting in increased costs. Correction of this problem has required repair to the workpieces involving application of adhesives, glue and the like or destruction of the supported structure.

There have been various attempts in the prior art to use double ended studs with a flange to hold a structure on to a workpiece.

These prior art references however, disclose both ends of the studs to be threaded in the same direction. Pertinent prior art which discloses both ends of studs to be threaded in an identical direction is shown by U.S. Pat. Nos. 3,897,713; 3,458,132; 2,263,050; 1,896,388; and 1,126,531.

The prior art also discloses double ended fasteners having threads in the opposite direction. The primary use for these fastening devices is to fasten two separate pieces together. The fasteners are generally provided with a central section which can be turned by a wrench or other tool for rotation so that both ends of the fastener simultaneously turn drawing to opposing members together until they are tightly fastened to each other. Examples of such fastening devices are shown by U.S. Pat. Nos. 3,943,818; 3,276,172; 2,877,732; 1,644,477; 1,610,934; 928,237; 571,042; 375,907; 313,193 and 197,721.

SUMMARY OF THE INVENTION

The present invention provides a double-ended threaded stud member with a right hand thread on the nut end and a left hand thread on the workpiece end. Obviously this threading direction could be reversed depending upon the fastener use.

The double-ended stud member is provided with a rigid flange between the threaded stud sections. With the right hand/left hand thread combination the nut can be removed from the stud without backup problems as the stud is actually tightened in the workpiece and the flange keeps the thread of the stud from entering deeper into the hole while distributing the torque forces along the top of the workpiece.

DESCRIPTION OF THE PREFERRED EMBODIMENT

Figure 1:
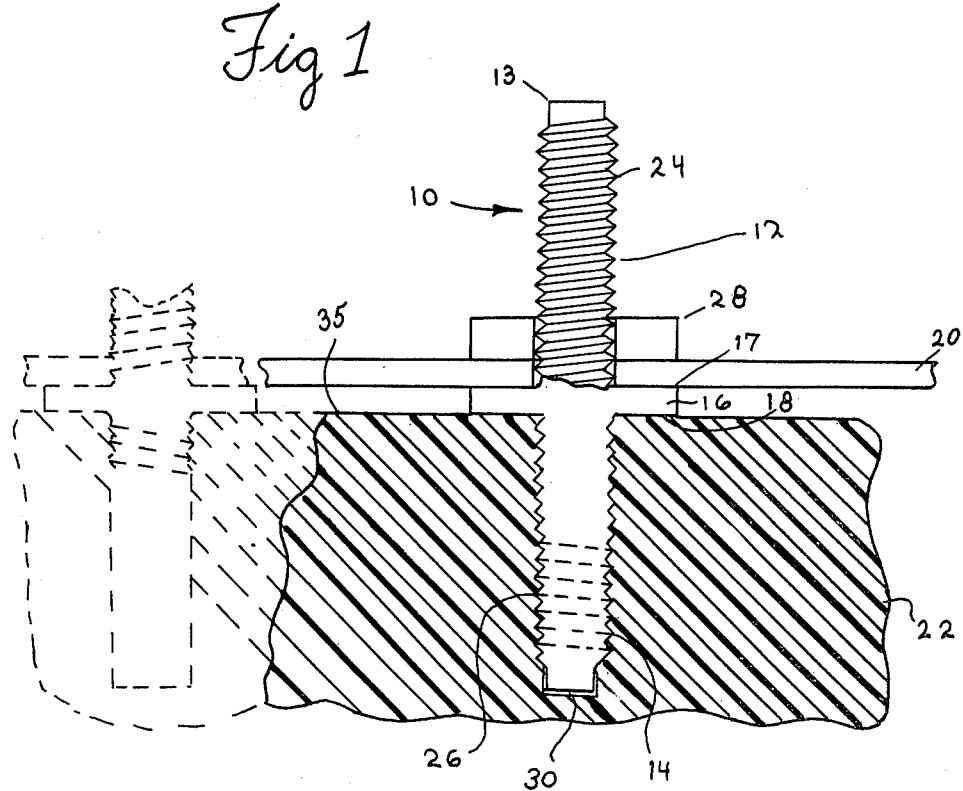
FIG. 1 is a side elevational view of an assembly showing a double-ended stud member with one shank being mounted in a workpiece and shown in cross section; and another identical stud member shown in phantom.

As is shown in the drawings, the best mode of the invention contemplates an integral double-ended stud member 10 having an upper shank portion 12 and a lower shank portion 14 separated by an intermediate flange 16. The shank portion 12 is formed with a standard thread and can be engaged by a standard installation tool to provide the necessary torque to drive it into a workpiece.

In another embodiment the upper shank portion has no threads and receives a self threading nut. The lower shank portion 14 of both embodiments can be formed with a thread forming, thread cutting, pipe thread, standard machine screw thread or a thread with a locking feature depending upon the particular material forming the workpiece. It is however, preferably formed with a thread forming construction.

Figure 2:
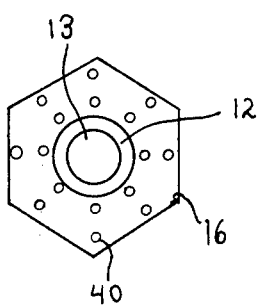
FIG. 2 is a plan view of the upper shank of the double ended stud member of FIG. 1 disclosing protuberances on the flange.

The integral flange 16 is preferably circular although it also can be a hexagonal configuration as shown in FIG. 2 and extends from the juncture of the shanks with the upper and lower face surfaces 17 and 18 being generally planar to present a flat bearing surface for the attachment member 20 and a torque bearing surface on the workpiece 22.

It will be noted that the thread convolutions 24 and 26 of the respective shanks 12 and 14 are of opposite hand of rotation so that when an associated threaded fastener such as nut 28 is removed from the upper shank section 12 which is preferably provided with right hand threads it will tend to drive the stud member further into the work aperture 30 of the workpiece rather than to dislodge it from the workpiece. This driving tendency is stopped by the flange 16 bearing against the surface of the workpiece 22 and distributes the torque force along the abutting surface of the workpiece. The stud member 10 of the present invention is most effectively used in a work aperture 30 of a plastic composition workpiece 22 where the diameter of the aperture 30 is somewhat smaller than the crest diameter of the threads 26 although it works equally well in workpieces of a metallic composition.

With such a dimensional relationship between the stud and the aperture, the shank 14 may be driven into and cut threads in the workpiece. When the flange 16 of the stud member 10 has been torqued or forced down onto the upper surface 35 of the workpiece the lower flange surface 18 will effectively seal the flange relative to the workpiece and provide positive retention.

Thus, it is to be seen from FIG. 1 that stud member 10 will be effectively locked from relative movement within the aperture 30. It will be appreciated that the attachment member 20 can be rotated when placed upon one of the studs but that when two or more studs are placed on the workpiece as shown in phantom in FIG. 1 that the attachment piece cannot be rotated.

Figure 3:
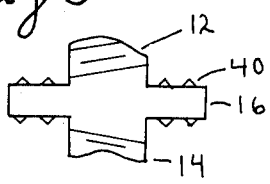
FIG. 3 is a partial side elevational view of the embodiment of FIG. 2.

FIGS. 2 and 3 disclose a slightly modified form of the stud member 10 in which the flange is provided with protuberances 40 which restrict the movement of the flange on the surface of the adjoining body. It should be noted that the stud can be driven into the workpiece by a standard automatic driving tool. As shown in FIG. 2 the surfaces of the flange can be provided with spiked protuberances 40 on either side of the flange to prevent rotation of the stud on the workpiece or rotation of the attachment member 20 on the flange.

Figure 4:
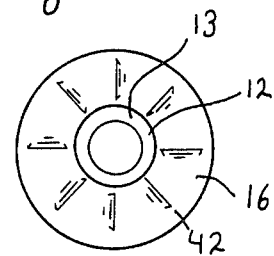
FIG. 4 is a plan view of the upper shank of the double ended stud member of FIG. 1 disclosing an alternate flange embodiment.
Figure 5:
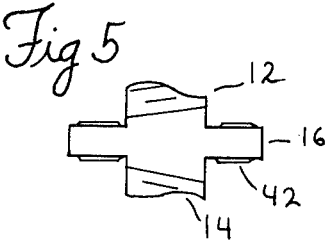
FIG. 5 is a partial side elevational view of the embodiment of FIG. 4.

In another flange embodiment as shown in FIGS. 4 and 5 beveled edges or serrations 42 are disclosed so that upon any backup the high angled surfaces of the serrations will dig into the material they abut.

Figure 6:
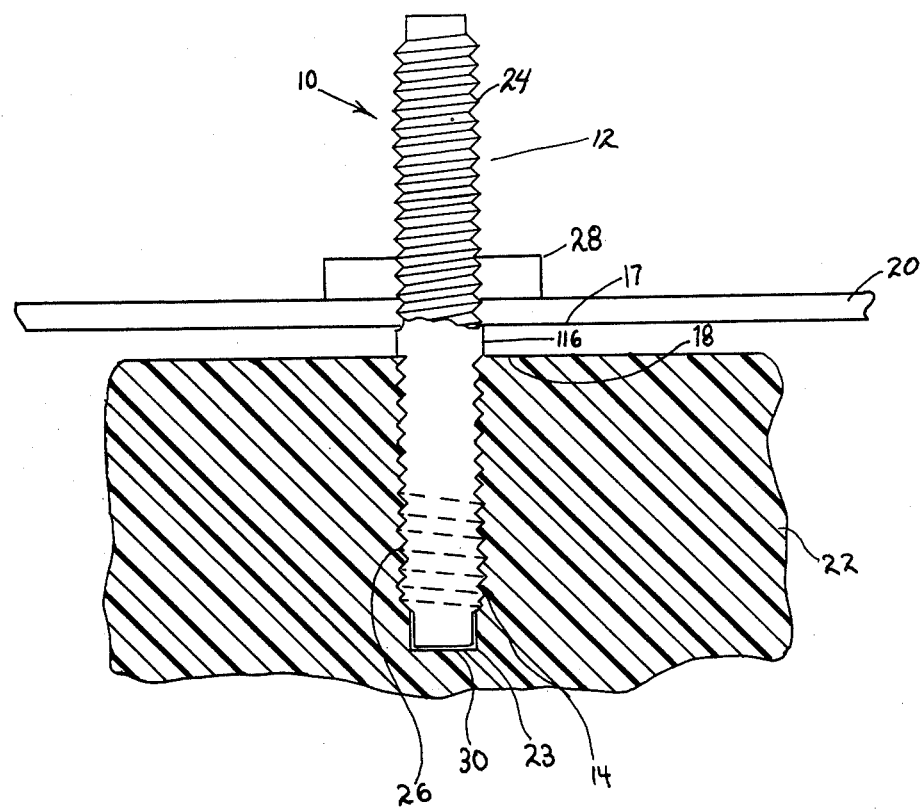
FIG. 6 is a side elevational view of another embodiment of the double ended stud member.

In an alternate embodiment of the invention, as shown in FIG. 6, the double ended stud 12 is inserted into a blind bore 25 in the workpiece 22. In this embodiment, the lower shank portion 26 has a length which is equal to the depth of the blind bore so that the lower shank portion end 130 abuts the material forming the end of the blind bore thus preventing the lower shank portion from being carried farther into the workpiece. In this embodiment it should be noted that the flange 116 is slightly extended from the stud body and serves to interrupt the threads in the bore 23 and perform a positive retention in the bore rather than serving as a clamp as shown in the first embodiment. When two or more studs are used in the assembly in this embodiment or in the original preferred embodiment the attachment member is prevented from rotating around a stud before it is tightened into place.

In operation of the fastening assembly the upper shank of the stud member is placed in a power tool and the lower end of the shank member is inserted into the work aperture of a plastic workpiece. The stud is then rotated driving the threaded portion of the lower shank into connection with the workpiece until the stud is firmly seated in the workpiece with the flange surface abutting the workpiece preventing the stud from being driven deeper into the bore. An attachment member with an aperture of circular, slot or "U" shaped configuration is then placed down over the upper shank of the stud with the upper shank extending through the aperture so that the attachment member is seated against the upper surface of the flange. A nut is then driven down against the attachment member holding it flush against the flange so that it is mounted to the workpiece. This creates a clamp on the top of the flange and the bottom of the nut. If the attachment member needs to be removed or realigned or a new attachment member inserted, a tool is inserted over the upper end of the shank and the nut is removed. The initial starting torque does not back the lower shank of the stud out of the plastic workpiece and the torque forces are dissipated as bearing forces on the flange portion of the stud. The attachment member is then removed or adjusted if need be, and a new nut is placed down on the assembly holding the attachment member in place.

It should be understood that the examples are not meant to limit the invention in any manner nor is the invention limited to any one embodiment described herein. On the contrary, it is intended to cover all alternatives, modifications and equivalents as may be included within the spirit and scope of the invention as defined by the appended claims.

What is claimed is:

1. A workpiece fastening assembly for fastening an attachment member to a plastic workpiece comprising in combination a stud member including upper and lower shank portions and an outwardly extending flange intermediate said shank portions, said flange having substantially planar upper and lower surfaces, said upper shank portion being threaded in one direction and said lower shank portion being threaded in the opposite direction from the upper shank portion, said lower shank portion being threaded in a plastic workpiece until the lower surface of the flange abuts the plastic workpiece, an attachment member mounted on the upper surface of said flange, said attachment member defining an aperture therein through which said upper shank portion protrudes and nut means threadably mounted on said upper shank, said nut means being rotated on said upper shank until the lower surface of said nut means engages said attachment member to hold said attachment member against said flange, the initial back off torque of said nut means when rotated to remove it from said upper shank after engaging said attachment tightening said lower shank in said plastic workpiece.

2. A double ended stud as claimed in claim 1 wherein said flange is hexagonal.

3. A double ended stud as claimed in claim 1 wherein flange is substantially circular.

4. A double ended stud as claimed in claim 1 wherein said upper shank is provided with a right hand thread and said lower shank is provided with a left hand thread.

5. A double ended stud as claimed in claim 1 wherein one of said flange surfaces has a plurality of protuberances.

6. A double ended stud as claimed in claim 1 wherein both of said flange surfaces has a plurality of protuberances.

7. A double ended stud as claimed in claim 1 wherein said lower shank is provided with a thread cutting thread.

8. A double ended stud as claimed in claim 1 wherein said lower shank is provided with a modified pipe thread.

9. A double ended stud as claimed in claim 1 wherein said lower shank is provided with a thread forming thread.

10. A double ended stud as claimed in claim 1 wherein said lower shank is provided with a standard machine screw thread.

11. A workpiece fastener assembly as claimed in claim 1 wherein said lower shank is provided with a modified pipe thread.

12. A fastening assembly for a plastic workpiece comprising in combination a double ended stud with a coaxially aligned upper and lower shank portions and an outwardly extending flange intermediate said shank portion, said flange having substantially planar upper and lower surfaces, said upper shank portion being threaded in one direction and said lower shank portion being threaded in the opposite direction from the upper shank portion, said lower shank portion thread being provided with a cutting edge and extending from substantially the end of the lower shank to the flange, said lower shank portion being threaded in a blind bore in a workpiece, the depth of the bore in said workpiece being substantially equal to the length of the lower shank portion so that the end of the lower shank abuts the end of the blind bore when the stud is fully secured in said workpiece with the lower surface of the flange abutting the threads of the workpiece bore, a structure mounted on the upper surface of said flange and defining an aperture therein through which said upper shank portion protrudes and fastening means mounted on said upper shank and threadably engaging said upper shank with the lower surface of said fastening means engaging said structure to hold said structure against said flange, the initial back off torque of said fastening means when rotated to remove it from said upper shank after engaging said structure tightening said lower shank in said workpiece.

13. A workpiece fastener assembly as claimed in claim 12 wherein said aperture is a slot.

14. A workpiece fastener assembly as claimed in claim 12 wherein said aperture is substantially "U" shaped.

15. A workpiece fastening assembly for fastening a structure to a plastic workpiece comprising in combination at least two double ended studs, each of said studs comprising coaxially aligned upper and lower shank portions and an integral outwardly extending flange located substantially intermediate said shank portion, said flange having substantially planar upper and lower surfaces, said upper shank portion being threaded in one direction and said lower shank portion being threaded in the opposite direction, said lower shank portion being threaded in a workpiece until the lower surface of the flange abuts the workpiece, a structure mounted on the upper surface of said flanges and defining a plurality of apertures therein through which said upper shank portions protrude and fastening means mounted on each upper shank and threadably engaging said upper shank so that upon rotation of the fastening means the lower surface of the fastening means engages said structure to hold said structure against the flange with the plurality of studs preventing rotation, each fastening means when initially rotated to remove it from said upper shank after engaging said structure tightening said lower shank in said workpiece.

16. A method of fastening an apertured structure to a plastic workpiece with a plurality of performed bores and later removing the structure from the plastic workpiece comprising the steps of:
   (a) rotating a plurality of threaded studs each of which is formed with oppositely threaded upper and lower shank portions and a laterally extending flange therebetween into the plastic workpiece bores until said flange contacts said plastic workpiece,
   (b) placing a structure defining a plurality of apertures over said upper shank portions so that said structure covers the adjacent surface of said flanges and abuts the surface of said flanges with said upper shank portions extending through said structure and beyond said structure,
   (c) threading a plurality of nuts onto the upper shank portion in an opposite direction from the direction in which the lower shank portion was threaded into the plastic workpiece until each nut fits snugly against said structure and holds said structure together against the upper surface of said flanges, and
   (d) rotating said nuts in an opposite direction than the direction in which they were threaded on said upper shank portion to transmit the starting torque forces to said flange and tighten said lower shank portions in said plastic workpiece.

17. A fastening assembly for a plastic workpiece having a plurality of performed bores comprising in combination at least two double ended studs, each of said studs comprising coaxially aligned upper and lower shank portions and an integral outwardly extending flange located substantially intermediate said shank portions, said flange having substantially planar upper and lower surfaces and an outer surface forming drive means, said upper shank portion being threaded in one direction and said lower shank portion being threaded in the opposite direction, said shank portions being threaded from the outer end to the flange, said lower shank portion of each stud being threaded into a bore of a plastic workpiece by rotating said drive means until the lower surface of the flange abuts the plastic workpiece, a planar surfaced structure mounted on the upper surface of said flanges and defining a plurality of apertures therein through which said upper shank portions protrude and fastening means mounted on each upper shank and threadably engaging said upper shank so that upon rotation of the fastening means, the lower surface of the fastening means engages said structure to hold said structure against the stud flange with the plurality of studs preventing rotation, each fastening means being threaded on said upper shank and tightened against said structure, each said fastening means when initially rotated to remove it from said upper shank after engaging said structure tightening said lower shank in said workpiece.

* * * * *